Patented Aug. 10, 1926.

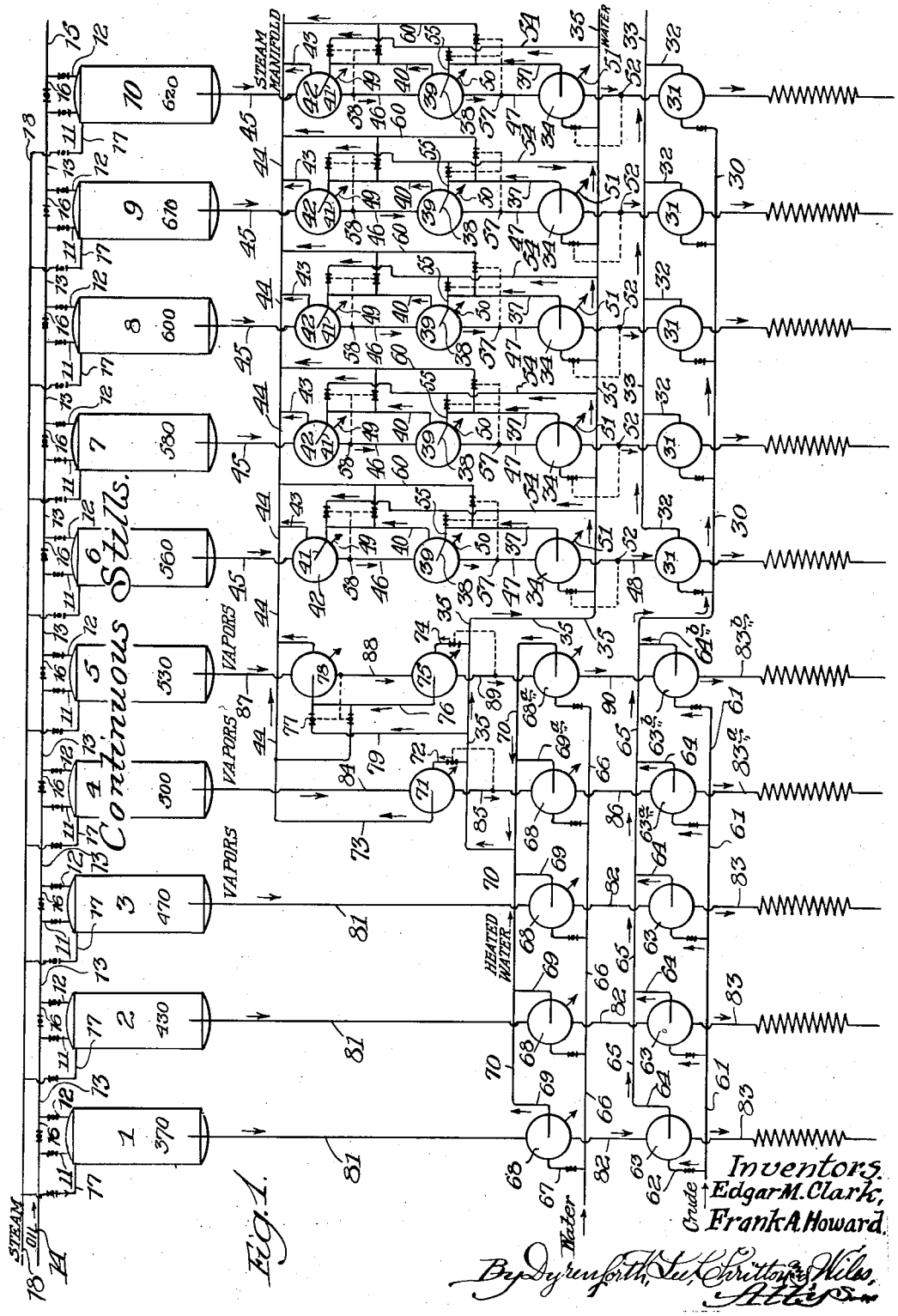

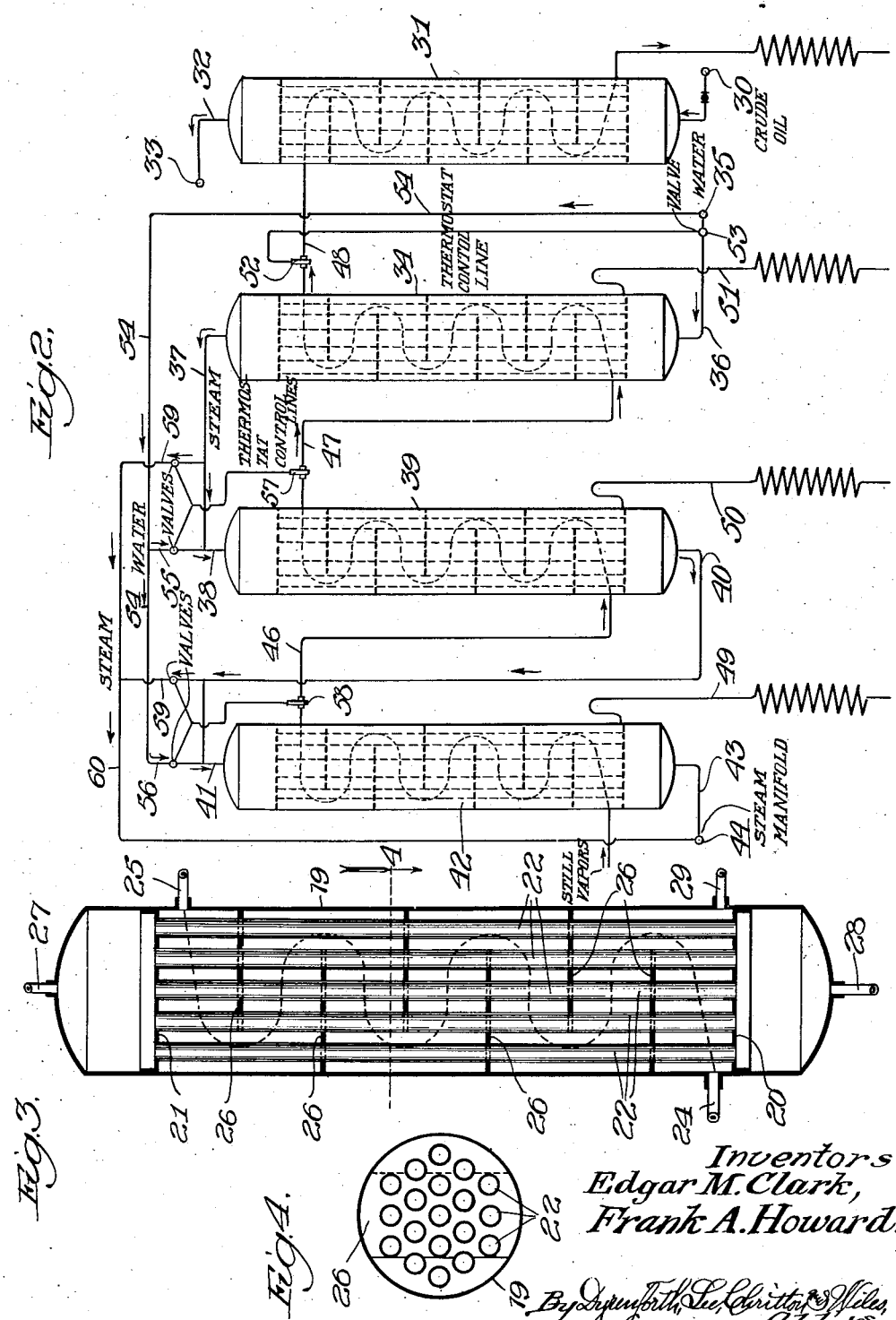

1,595,642

UNITED STATES PATENT OFFICE.

EDGAR M. CLARK, OF NEW YORK, N. Y., AND FRANK A. HOWARD, OF ELIZABETH, NEW JERSEY, ASSIGNORS TO STANDARD DEVELOPMENT COMPANY, A CORPORATION OF DELAWARE.

ART OF FRACTIONALLY DISTILLING AND CONDENSING OILS.

Application filed May 5, 1922. Serial No. 558,608.

The present invention relates to the art of distilling and condensing hydrocarbon oils, and will be fully understood from the following description, illustrated by the accompanying drawings, in which:

Figure 1 is a diagrammatic view, showing an arrangement of apparatus suitable for carrying the invention into effect;

Fig. 2 is a detailed diagrammatic view showing a condenser arrangement suitable for use upon the vapors from a still producing, for example, lubricating fractions, in accordance with the present invention;

Fig. 3 is a vertical sectional view of a condenser suitable for use in carrying out the present invention; and Fig. 4 is a horizontal sectional view on the line 4 of Fig. 3.

The present invention relates more particularly to the continuous distillation of crude or reduced crude oils and especially to that type of oil distillation in which the oil passes through a series of stills, usually of the horizontal cylindrical type, heated to successively higher temperatures, steam ordinarily being introduced into the stills in varying amounts, to aid in driving off the desired fractions of the oil. In carrying out such a distillation, it is one of the aims of the present invention to produce by fractional condensation, without re-running, oil fractions, and particularly viscous oil fractions, having short boiling-point ranges and free from undesirably low boiling-point constituents which might tend to reduce the flash point of the condensed product.

In carrying out the present invention, the vapors issuing from the several stills are cooled by indirect heat exchange through a heat conductive wall by means of a fluid of low specific heat and with a low rate of heat transfer. The cooling medium preferably employed in carrying out the invention is a vapor, for example, steam or super-heated steam, and at lower temperatures, a lower temperature vapor or a liquid, such as water, may be employed in admixture with a vapor or in such manner as to be vaporized during the condensing or heat exchange and to be in vapor form during a substantial part thereof. Any suitable pressure, say about 100 lbs. per square inch, may be maintained upon the water to control its boiling-point. The temperature gradient or difference between the super-heated vapors employed as a cooling medium and the hydrocarbon vapors to be subjected to condensation preferably does not exceed 200° F., and ordinarily does not exceed 100 to 150° F. In carrying out the present invention, it is frequently desirable to control the effect of the cooling medium by the temperature of the cooled, uncondensed hydrocarbon vapors, as more fully pointed out hereinafter.

Referring more particularly to the drawings, in Figure 1 the numerals 1 to 10 indicate stills, for example, of the horizontal cylindrical type, arranged in succession in order of number. These stills may suitably be arranged, as is common practice, at successively lower levels so that a gravity flow of oil through the series of stills may be established. Valved inlet lines 11 and outlet lines 12 are provided for each of the stills, connecting lines 13 being provided between the outlet line of each still (except the last) and the inlet line of the next still. The oil to be distilled is fed through line 14 to the inlet line 11 of the first still, travels through the series of stills in succession and the residue from the last still is discharged through line 15. Valved by-pass lines 16 are provided for each of the stills so that any one still can be cut out of the series or the flow therethrough controlled. Steam lines 17 from the steam manifold 18 enter the stills, the steam lines being provided with suitable valves as indicated in the drawings.

Vapors issuing from each of the stills pass through vapor lines and fractional condensers, the number and mode of cooling of which is dependent upon the vapor temperatures in the stills. For example, in a series of stills such as that illustrated in Figure 1, a temperature within the range of 480 to 520° F. may be maintained in the still 4, in which case the preceding stills may each be provided with two fractional condensers and the succeeding stills may each be provided with four fractional condensers, still No. 4 being provided with three. In such case, the stills preceding the still 4 yield no viscous or lubricating fractions; still No. 4 may yield lubricating fractions in the first condenser and the succeeding stills yield lubricating fractions of varying grades.

To facilitate a proper understanding of the condensing system, reference may be made to Figures 3 and 4 which illustrate the construction of a type of condenser found useful in connection with the present invention.

The condenser illustrated in Figures 3 and 4 is of the tubular type, consisting of a vertical cylinder 19 provided internally with spaced header plates 20 and 21 between which extend the tubes 22. The still gases enter the condenser in the space between the header plates and surround the tubes, entering at 24 and making their exit at 25. Baffles 26 are provided to force the still gases and vapors to follow a circuitous course through this space. The cooling medium employed may enter the condenser at the top through the inlet 27 and makes its exit at the bottom through the outlet 28, or may travel through the condenser in the reverse direction. Condensates from the still vapors are discharged through the outlet 29.

In Figure 2 there is illustrated diagrammatically in detail the arrangement of condensers used, for example, with stills 6 to 10 of the battery shown in Figure 1. The numeral 30 indicates a manifold, to which the stock, for example, crude oil, which may be preheated, is supplied. The crude oil passes through the condenser 31 within the tubes, serving as a cooling medium for the still vapors, and makes its exit through the outlet 32, entering manifold 33. The condenser 31 is the one of the series most remote from the still.

The cooling medium supplied to the next condenser, indicated by numeral 34, may suitably be a liquid, for example, water, which may be preheated, if desired, to, say, 340 to 358° F. at a pressure of 150 pounds. It is supplied from manifold 35 through valved inlet 36 and passes upwardly through the tubes and condenser 34, being converted into superheated steam in its passage through the condenser. The steam passes out of the condenser through pipe 37, into the inlet 38 into the next condenser 39, through which it passes downwardly through the tubes. The steam or vapor is further super-heated in passing through this condenser, effects partial condensation by indirect heat exchange with the still gases, and makes its exit through the discharge line 40 which leads through inlet 41 into the condenser 42 nearest the still. Here the superheated steam again serves as a cooling medium for the still gases, and is discharged through line 43 into a super-heated steam manifold 44. The still vapors, which are a mixture of hydrocarbon vapors and steam, enter the condenser 42 through line 45, and uncondensed vapors pass out through line 46 into condenser 39. From condenser 39 uncondensed vapors pass through line 47 into condenser 34, and from condenser 34 uncondensed vapors pass through line 48 into condenser 31. Dotted connecting lines within the condensers illustrate the path of the vapors through the condensers. Condensates pass out of condensers 42, 39 and 34, through lines 49, 50 and 51 respectively. The direction of flow of the still vapors and the cooling medium may be concurrent or countercurrent, as desired.

The supply of cooling medium or its temperature or both may be controlled for each of the condensers 34, 39 and 42 by the temperature of the uncondensed still vapors issuing from said condensers. A thermal regulator 52 in the still vapor line 48 controls valve 53 in the line 36 by which the heated liquid or water enters condenser 34 from manifold 35. Cold water or vapor or gas cooler than the super-heated steam may be supplied here in place of heated water, if desired. A branch line 54 from manifold 35 is provided with valved connections 56 and 57 leading into the inlets 38 and 41 to condensers 39 and 42. A thermal regulator 57 in the still vapor line 47 controls the valve in the connection 55 and a thermal regulator 58 in the still vapor line 46 controls the valve in connection 56.

Ordinarily the control of the cooler fluid (vapor or liquid) admixed with the steam entering the condensers by the means illustrated is sufficient for the proper thermal regulation of the condenser. Additional means may be provided; for example, by-passing a greater or less quantity of steam instead of permitting it to enter the condenser. Such means are likewise illustrated in the drawing, the numeral 59 indicating valved by-pass connections, likewise controlled by the thermal regulators 57 and 58 and leading from lines 37 and 40 into the line 60, which in turn leads to the steam manifold 44. For convenience in reference the respective parts in the vapor system of stills 6 to 10 of Figure 1 are given the same numerals as the corresponding parts in Figure 2.

In the arrangement of apparatus in Figure 1 it will be noted that stills 1, 2 and 3 each have two condensers in series in their vapor lines; still 4 has 3; and still 5 has 4, the flow of cooling medium being different in these stills from that previously disclosed in connection with the vapor systems of stills 6 to 10 inclusive. In Figure 1, the numeral 61 indicates a manifold into which crude oil is forced. This manifold, through valved lines 62, supplies crude oil as a cooling medium to the condensers 62, each of which is of the same type as shown in Figures 3 and 4 of the drawings. From the condensers 63 the cooling medium discharges through lines 64 into the manifold 65, which feeds the manifold 30, which in turn supplies the pre-heated crude oil as a cooling medium through the condensers 31. Such use of crude oil is, of course, optional and water or other cooling medium may be substituted therefor, if desired. Water at ordinary temperatures, say 50 to 80° F., is supplied to the manifold 66, and from this manifold it is supplied through valved connections 67 to the condensers 68. The heated water is discharged from these condensers through lines 69 into a manifold 70. This heated water is supplied from manifold 70 to the manifold 35, which in turn supplies it as a cooling medium to other condensers of the system.

From manifold 35 the heated water is supplied to the condenser 71 of still 4 through valved connection 72 in the same manner as heated water is supplied to the condenser 34 in the apparatus of Figure 2. The supply of water to this condenser is thermally controlled from the vapors issuing from the condenser. The steam formed in condenser 71 passes through line 73 into the steam manifold 44. Similarly, hot water is supplied from manifold 35 through valved connection 74 into the condenser 75 of still 5, and from this condenser the steam generated passes through line 76 to the inlet 77 of condenser 78. A valved line 79 leads from the hot water manifold 35 to the condenser inlet 77 and a valved by-pass line 80 leads from the line 76 to the steam manifold 44. The valves on the by-pass line 80 and the hot water line 79 are suitably controlled by the temperature of the still vapors issuing from the condenser 78 and the valve of the hot water connection 74 leading into the condenser 75 is controlled by the temperature of the still vapors leaving that condenser. Suitable discharge lines for condensates are provided from each of the condensers, these discharge lines being indicated in Fig. 1 by oblique lines with arrow tops.

In the diagram of Figure 1, the suffix *a* is used in connection with still 4 and the suffix *b* in connection with still 5 where similar numerals are used to indicate parts similar to those connected with stills 1, 2 and 3.

The vapors from stills 1, 2 and 3, in the arrangement illustrated that is, those which do not exceed in temperature about 480° F., pass through overhead lines 81 into condensers 68, in which they preheat the water supplied from manifold 66, at the same time uncondensing out light fractions. The uncondensed vapors pass on through lines 82 into the condensers 63, which they serve to preheat crude oil supplied from manifold 61. Vapors and condensate together pass on from condensers 63 through the condenser lines 83.

The vapors from still 4, which may be, for example, at a temperature of 480 to 520° F., pass through line 84 into condenser 71, in which they are partially cooled by the hot water from the manifold 35, the drop in temperature being, say, 30 to 60°. This water is substantially at its boiling-point when supplied to the condenser, which consequently generates steam therefrom, the steam being supplied through line 73 to the steam manifold 44. The uncondensed still vapors issue from condenser 71 through line 85 into condenser 68ª, which is cooled by water from the manifold 66, a drop in temperature of, say, 200° taking place here. Uncondensed vapors from the condenser 68ª, which will ordinarily consist almost entirely of still steam, pass through vapor line 86 into the condenser 63ª, in which they are further cooled by the incoming crude oil from manifold 61. From condenser 63ª the cooled products pass out through the cooling line or condenser 83ª. The hot water entering the condenser 71 from manifold 35 is thermally controlled by the temperature of the still vapors issuing from that condenser.

The vapors from still 5 pass out through vapor line 87 into condenser 78, which is cooled by means of steam supplied from condenser 75 through line 76 and, if desired, by hot water from the manifold 35 through line 79. The supply of steam and of water may suitably be controlled by the temperature of the vapors issuing from the condenser 78, in the manner described in connection with the condensers shown in Figure 2. From the condenser 78 uncondensed vapors issue through line 88 into condenser 75, where they are coooled by hot water from the manifold 35 in the same manner as previously described in connection with the condensers 34 of Figure 2. From the condenser 75 uncondensed vapors pass through line 89 into condenser 68ª, in which they are cooled by water in the manner described in connection with the condensers 68. From the condenser 68ª, the vapors issuing through line 90 into the condenser 63ᵇ will ordinarily consist substantially entirely of still steam. The drop in temperature in condenser 78 may be, for example, 20 to 40° F., and in 75, 30 to 60° F.

The passage of vapors from stills 6, 7, 8, 9 and 10 will be clear from the description hereinbefore given of the condenser system of Figure 2, which is employed in connection with each of these stills. To illustrate the rate of cooling of the vapors in the various condensers with the temperature of still 6 from 540 to 570° F., the drop in temperature in condenser 42 may be from 10 to 30°; that in condenser 39 from 20 to 50° and that in condenser 34 from 75 to 125°. Thus, in a specific case in which the temperature of the vapors issuing from still 6 is 560°, the supply of cooling medium to the various condensers is so controlled that the temperature of the vapors issuing from the condenser 42 are about 540° F.; those issuing from condenser 39 about 510° F., and those issuing from condenser 34 about 410° F.

It is readily apparent that in operating a fractional distillation and condensing process in accordance with the present invention, a small temperature drop may be secured in each of the condensers without any vigorous chilling or shocking of the vapors. It is further apparent that the arrangement and number of condensers may be greatly varied in accordance with the results desired wthout departing from the invention. For example, water may be used in place of crude oil as a cooling medium; low temperature steam, for example, at 215 to 275° F. may be substituted for the hot water in controlling the temperature of the cooling medium, and the direction of flow of the cooling medium through the condensers may be countercurrent to or concurrent with that of the still vapors.

We claim:

1. The method of fractionally condensing hydrocarbon oil vapors which consists in passing said vapors successively through a plurality of heat exchangers, introducing water at substantially its boiling-point into one of said heat exchangers in indirect heat-conductive contact with said hydrocarbon oil vapors, causing the water to travel through said condenser in the same direction as the hydrocarbon oil vapors, the water being converted to steam therein, delivering the generated steam to another of said heat exchangers through which the hydrocarbon oil vapors pass in indirect heat-conductive contact therewith before entering the first heat exchanger, admixing water at substantially its boiling-point with said steam before it enters the second-mentioned heat exchanger and passing the mixed steam and water through the latter heat exchanger in a direction opposite to that of flow of the hydrocarbon oil vapors therethrough.

2. The method of fractionally condensing hydrocarbon oil vapors which consists in passing said vapors succesively through a plurality of heat exchangers, introducing water at substantially its boiling-point into one of said heat exchangers in indirect heat-conductive contact with said hydrocarbon oil vapors, the water being converted to steam therein, controlling the amount of water supplied to said heat exchanger by the temperature of the hydrocarbon oil vapors issuing therefrom, delivering the steam generated in said heat exchangers to another of said heat exchangers through which the hydrocarbon oil vapors pass in indirect heat-conductive contact therewith before entering the heat exchangers, and controlling the amount of steam by the temperature of the uncondensed hydrocarbon oil vapors issuing therefrom.

3. The method of fractionally condensing hydrocarbon oil vapors which consists in passing said vapors successively through a plurality of heat exchangers, introducing water at substantially its boiling-point into one of said heat exchangers in indirect heat-conductive contact with said hydrocarbon oil vapors, the water being converted to steam therein, controlling the amount of water supplied to said heat exchangers by the temperature of the hydrocarbon oil vapors issuing therefrom, delivering the steam generated in said heat exchanger to another of said heat exchangers thruogh which the hydrocarbon oil vapors pass in indirect heat-conductive contact therewith before entering the heat exchanges, admixing water at substantially its boiling-point with said steam before it enters the second-mentioned heat exchanger, and controlling the proportion of water by the temperature of the uncondensed vapors issuing from said heat exchanger.

4. The method of fractionally condensing hydrocarbon oil vapors which consists in passing said vapors successively through a plurality of heat exchangers, introducing water at substantially its boiling-point into one of said heat exchangers in indirect heat-conductive contact with said hydrocarbon oil vapors, the water being converted to steam therein, controlling the amount of water supplied to said heat exchangers by the temperature of the hydrocarbon oil vapors issuing therefrom, delivering the steam generated in said heat exchanger to another of said heat exchangers through which the hydrocarbon oil vapors pass in indirect heat-conductive contact therewith before entering the heat exchangers, admixing water at substantially its boiling-point with said steam before it enters the second-mentioned heat exchanger, and controlling the proportions of water and steam separately by the temperature of the vapors issuing from said heat exchanger.

5. The method of fractionally condensing hydrocarbon oil vapors which consists in passing said vapors successively through a plurality of heat exchangers, introducing water at substantially its boiling-point into one of said heat exchangers in indirect heat-conductive contact with said hydrocarbon oil vapors, the water being converted to steam therein, controlling the amount of water supplied to said heat exchangers by the temperature of the hydrocarbon oil vapors issuing therefrom, delivering the steam generated in said heat exchanger to another of said heat exchangers through which the hydrocarbon oil vapors pass in indirect heat-conductive contact therewith before entering the heat exchangers, admixing water at substantially its boiling-point with said steam before it enters the second-mentioned heat exchanger, controlling the proportions of the water and steam separately by the temperature of the vapors issuing from said heat exchanger, and maintaining a pressure of about 100 lbs. per square inch on the water and steam in said system.

6. In apparatus for the fractional distillation of oils, a condenser having chambers separated by heat-conductive walls, means for passing still vapors through one of said chambers, baffles in said chamber to cause said vapors to take a circuitous course therethrough, means for passing superheated steam through the other of said chambers in counter-current to the direction of flow of the still vapors, means for controlling the flow of the super-heated steam by the temperature of the uncondensed vapors issuing from said condenser, means for commingling water substantially at boiling-point with the super-heated steam passing through said chamber, and means for controlling the proportion of said water by the temperature of the vapors issuing from the condenser.

7. In apparatus for fractionally condensing hydrocarbon oil vapors, a plurality of condensers, means for passing still vapors successively through said condensers, means for introducing water into one of said condensers in indirect heat-conductive contact with the vapors passing therethrough, thereby generating steam from said water, means for introducing the steam thus generated into a preceding condenser and for passing it therethrough in heat-conductive contact with the vapors travelling therethrough, means for commingling water with the steam entering the last-mentioned condenser, and means for controlling the proportion of water commingled with the steam by the temperature of the vapors issuing from the last-mentioned condenser.

8. In apparatus for fractionally condensing hydrocarbon oil vapors, a plurality of condensers, means for passing still vapors successively through said condensers, means for introducing water into one of said condensers in indirect heat-conductive contact with the vapors passing therethrough, thereby generating steam therefrom, means for controlling the supply of water to said condenser by the temperature of the vapors issuing therefrom, means for introducing the steam generated in said condenser into a preceding condenser and for passing it therethrough in indirect heat-conductive contact with the vapors travelling therethrough, means for commingling water with the steam entering the last-mentioned condenser, and means for controlling the proportions of water and of steam admitted to the last-mentioned condenser by the temperature of the vapors issuing therefrom.

EDGAR M. CLARK.
FRANK A. HOWARD.